(12) United States Patent
Shin et al.

(10) Patent No.: US 12,265,698 B2
(45) Date of Patent: Apr. 1, 2025

(54) ELECTRONIC DEVICE FOR PROVIDING A PLURALITY OF USER INTERFACES TO SELECT DATA AND METHOD OF OPERATING THE SAME

(71) Applicant: SAMSUNG ELECTRONICS CO., LTD., Suwon-si (KR)

(72) Inventors: Woonggi Shin, Suwon-si (KR); Sangwon Shim, Suwon-si (KR); Eunah Jang, Suwon-si (KR); Minkoo Kang, Suwon-si (KR); Yong Kwon, Suwon-si (KR); Changkeun Kim, Suwon-si (KR); Donggun Park, Suwon-si (KR); Eunji Ahn, Suwon-si (KR); Younghak Oh, Suwon-si (KR); Hyunwoo Yoo, Suwon-si (KR); Yonggu Lee, Suwon-si (KR); Jaemyoung Lee, Suwon-si (KR); Heekyung Jeon, Suwon-si (KR); Jungwoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 17/849,083

(22) Filed: Jun. 24, 2022

(65) Prior Publication Data
US 2023/0061117 A1    Mar. 2, 2023

Related U.S. Application Data

(63) Continuation of application No. PCT/KR2022/007614, filed on May 27, 2022.

(30) Foreign Application Priority Data

Aug. 25, 2021  (KR) .................. 10-2021-0112385
Aug. 31, 2021  (KR) .................. 10-2021-0115242

(51) Int. Cl.
*G06F 3/04847*    (2022.01)

(52) U.S. Cl.
CPC ................ *G06F 3/04847* (2013.01)

(58) Field of Classification Search
CPC ................................................ G06F 3/04847
See application file for complete search history.

(56) References Cited

U.S. PATENT DOCUMENTS 6,147,693 A  *  11/2000  Yunker .................. G06F 9/451
                                                    345/473
2009/0019401 A1   1/2009  Park et al.
(Continued)

FOREIGN PATENT DOCUMENTS

JP        7-295751 A       11/1995
JP       2014-86972 A       5/2014
(Continued)

OTHER PUBLICATIONS

International Search Report (PCT/ISA/210) issued Aug. 22, 2022 by the International Searching Authority in International Application No. PCT/KR2022/007614.
(Continued)

*Primary Examiner* — Jennifer N Welch
*Assistant Examiner* — Amy P Hoang
(74) *Attorney, Agent, or Firm* — Sughrue Mion, PLLC

(57) ABSTRACT

According to various embodiments, an electronic device may include a display and a processor, wherein the processor is configured to control the display to display a first screen for configuring first data, control the display to display a second screen associated with the first data while displaying the first screen, receive, through the second screen, a first user input for changing a value of the first data displayed on the first screen from a first value to a second value, and after receiving the first user input, control the display to display, (Continued)

through the first screen, an animation which continuously displays values between the first value and the second value. Other embodiments may be possible.

18 Claims, 8 Drawing Sheets

(56) References Cited

U.S. PATENT DOCUMENTS

| | | | |
|---|---|---|---|
| 2011/0080351 A1 | 4/2011 | Wikkerink et al. | |
| 2012/0174010 A1* | 7/2012 | Flint | G11B 27/034 715/769 |
| 2013/0132892 A1* | 5/2013 | Lentz | G06F 3/04855 715/786 |
| 2014/0118784 A1 | 5/2014 | Ichiyama et al. | |
| 2015/0067613 A1 | 3/2015 | Kim et al. | |
| 2016/0062582 A1 | 3/2016 | Wilson et al. | |
| 2016/0170578 A1* | 6/2016 | Angermayer | G06F 3/0482 715/830 |
| 2018/0095938 A1* | 4/2018 | Monte | G06Q 10/109 |
| 2018/0136832 A1 | 5/2018 | Timmer et al. | |
| 2019/0121524 A1 | 4/2019 | Hakansson et al. | |
| 2021/0398085 A1* | 12/2021 | Paul | G06Q 10/1093 |
| 2022/0011725 A1* | 1/2022 | Chladek | G04G 21/025 |

FOREIGN PATENT DOCUMENTS

| | | |
|---|---|---|
| KR | 10-2004-0100586 A | 12/2004 |
| KR | 10-2009-0005680 A | 1/2009 |
| KR | 10-2012-0117610 A | 10/2012 |
| KR | 10-2015-0024654 A | 3/2015 |
| KR | 10-1525246 B1 | 6/2015 |

OTHER PUBLICATIONS

Written Opinion (PCT/ISA/237) issued Aug. 22, 2022 by the International Searching Authority in International Application No. PCT/KR2022/007614.

Communication issued Sep. 2, 2024 by the European Patent Office in European Patent Application No. 22861513.4.

English translation of KR 10-2004-0100586 A (KR 10-2004-0100586 A was previously submitted in the IDS of Sep. 20, 2022).

* cited by examiner

ELECTRONIC DEVICE FOR PROVIDING A PLURALITY OF USER INTERFACES TO SELECT DATA AND METHOD OF OPERATING THE SAME

CROSS-REFERENCE TO RELATED APPLICATIONS

This application is a continuation of International Application No. PCT/KR2022/007614 designating the United States, filed on May 27, 2022, in the Korean Intellectual Property Receiving Office and claiming priority to Korean Patent Application No. 10-2021-0112385, filed on Aug. 25, 2021, and to Korean Patent Application No. 10-2021-0115242, filed on Aug. 31, 2021, in the Korean Intellectual Property Office, the disclosures of which are incorporated by reference herein in their entireties.

BACKGROUND

Field

The disclosure relates to an electronic device which provides a plurality of user interfaces for selecting data, and a method of operating the same.

Description of Related Art

In line with rapid development of electronic technologies, functions of electronic devices such as computers, laptops, tablet PCs, navigation systems, smartphones, and portables have recently become diversified, and currently available electronic devices provide various user interfaces (UI) for user convenience. The user interfaces are advantageous in that information can be perceived by a user and the user can control the electronic devices intuitively and fast through convenient manipulation. Accordingly, there has recently been active development of technologies related to the user interfaces such that users can conveniently use electronic devices.

When the number or type of user interfaces provided to select data is limited, the user needs to additionally perform an unnecessary operation in the course of configuring data.

According to various embodiments, an electronic device and a method for operating the same may provide a user interface for configuring at least one piece of data and a user interface for selecting specific data from the at least one piece of data, and may provide an animation that dynamically changes to the specific data after the user selects the specific data.

SUMMARY

In accordance with aspects of the disclosure, an electronic device may include a display, and a processor, wherein the processor is configured to control the display to display a first screen for configuring first data, control the display to display a second screen associated with first data while displaying the first screen, receive, through the second screen, a first user input for changing a value of the first data displayed on the first screen from a first value to a second value, and after receiving the first user input, control the display to display, through the first screen, an animation which continuously displays values between the first value and the second value.

In accordance with aspects of the disclosure, an operating method of an electronic device including a display may include controlling the display to display a first screen for configuring first data, controlling the display to display a second screen associated with first data while displaying the first screen, receiving, through the second screen, a first user input for changing a value of the first data displayed on the first screen from a first value to a second value, and after receiving the first user input, controlling the display to display, through the first screen, an animation which continuously displays values between the first value and the second value.

Various embodiments may provide an electronic device and a method for operating the same, wherein not only various user interfaces for selecting data are provided, but also an animation is provided such that, even after the user selects data, data between pre-selection data and post-selection data is displayed continuously, thereby improving the user's convenience in data configuration.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
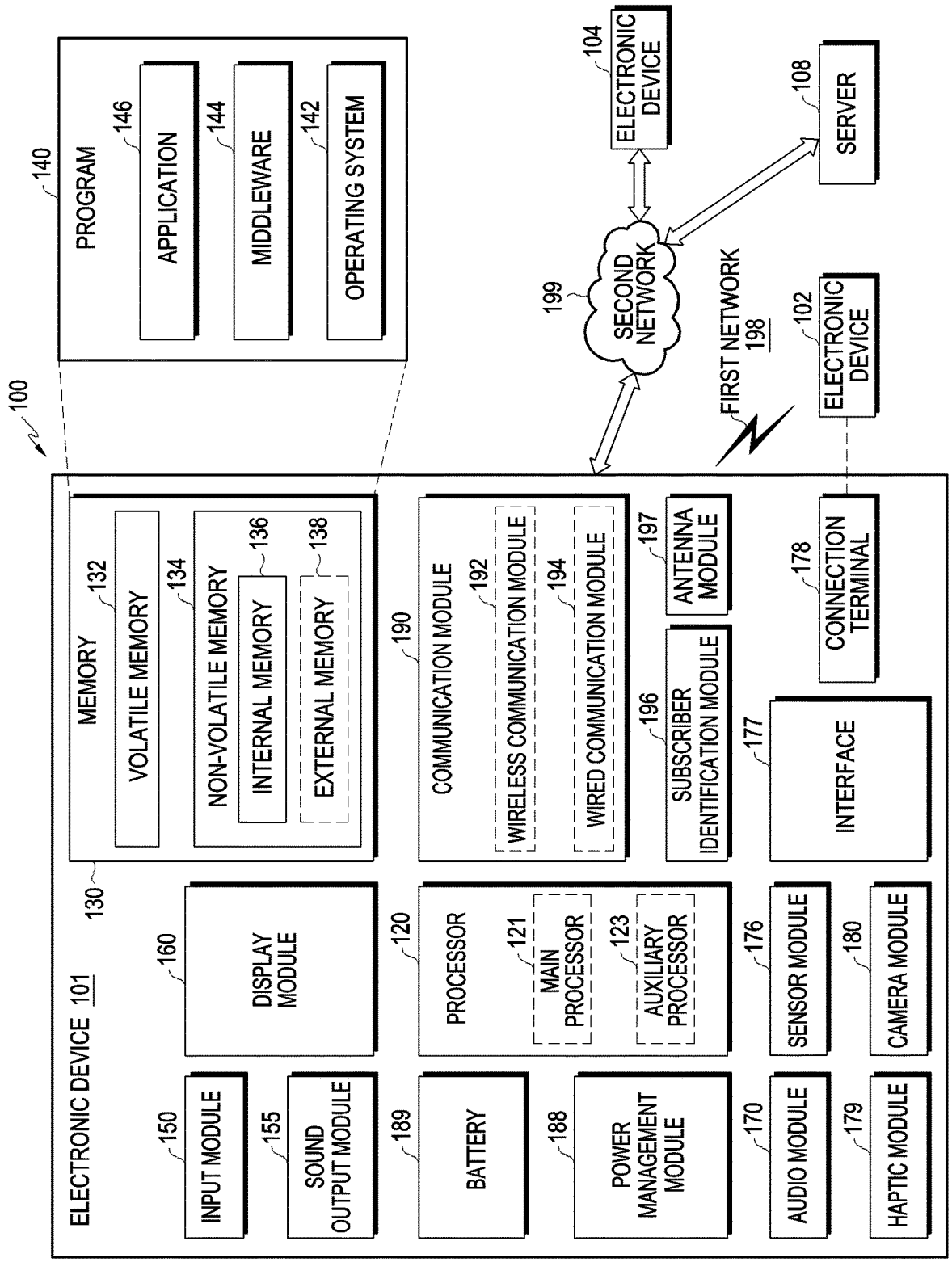
FIG. 1 is a block diagram of an electronic device in a network environment, according to various embodiments of the disclosure.

FIG. 1 is a block diagram illustrating an electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
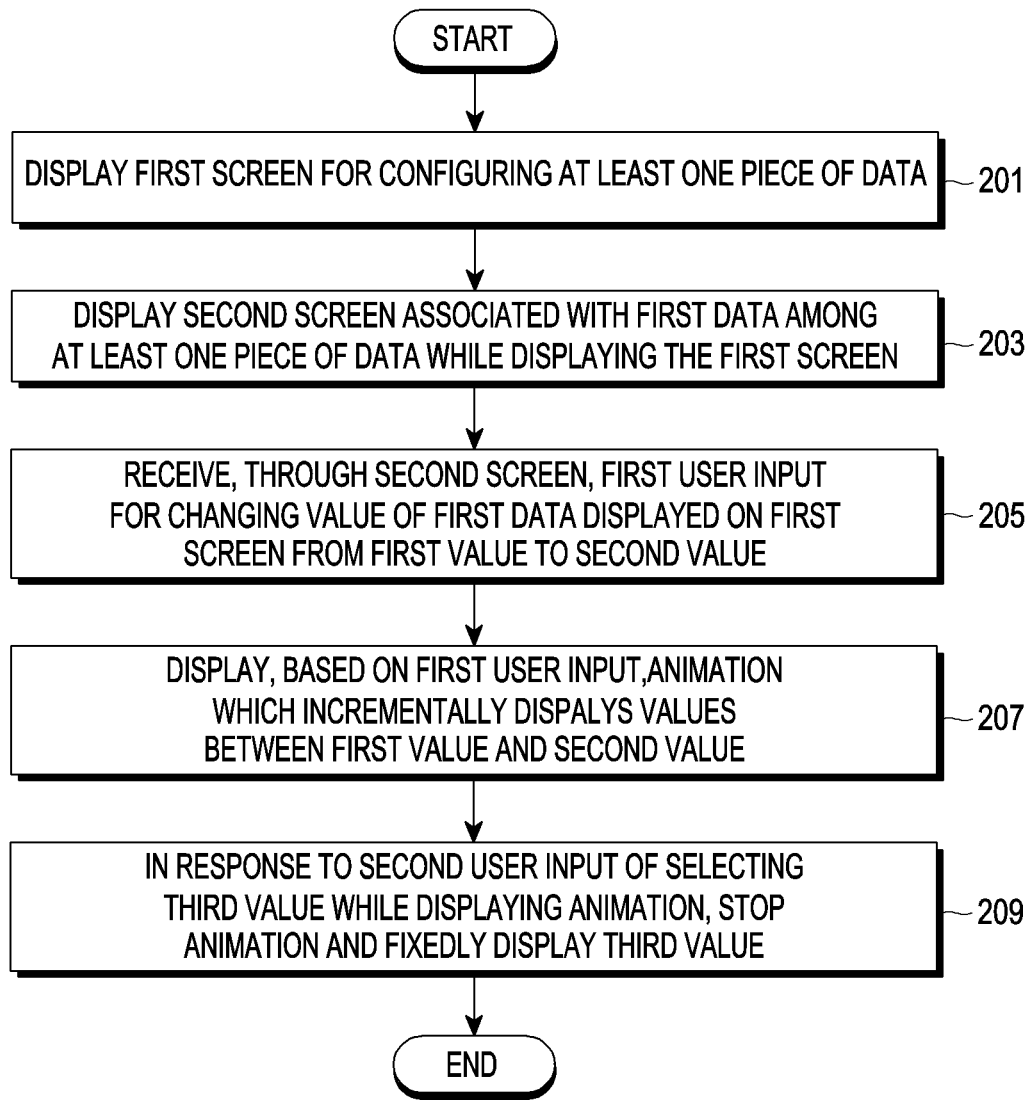
FIG. 2 is a flowchart illustrating an operating method of an electronic device, according to various embodiments of the disclosure.

FIG. 2 is a flowchart illustrating an operating method of an electronic device (e.g., the electronic device of FIG. 1), according to various embodiments of the disclosure.

Figure 3:
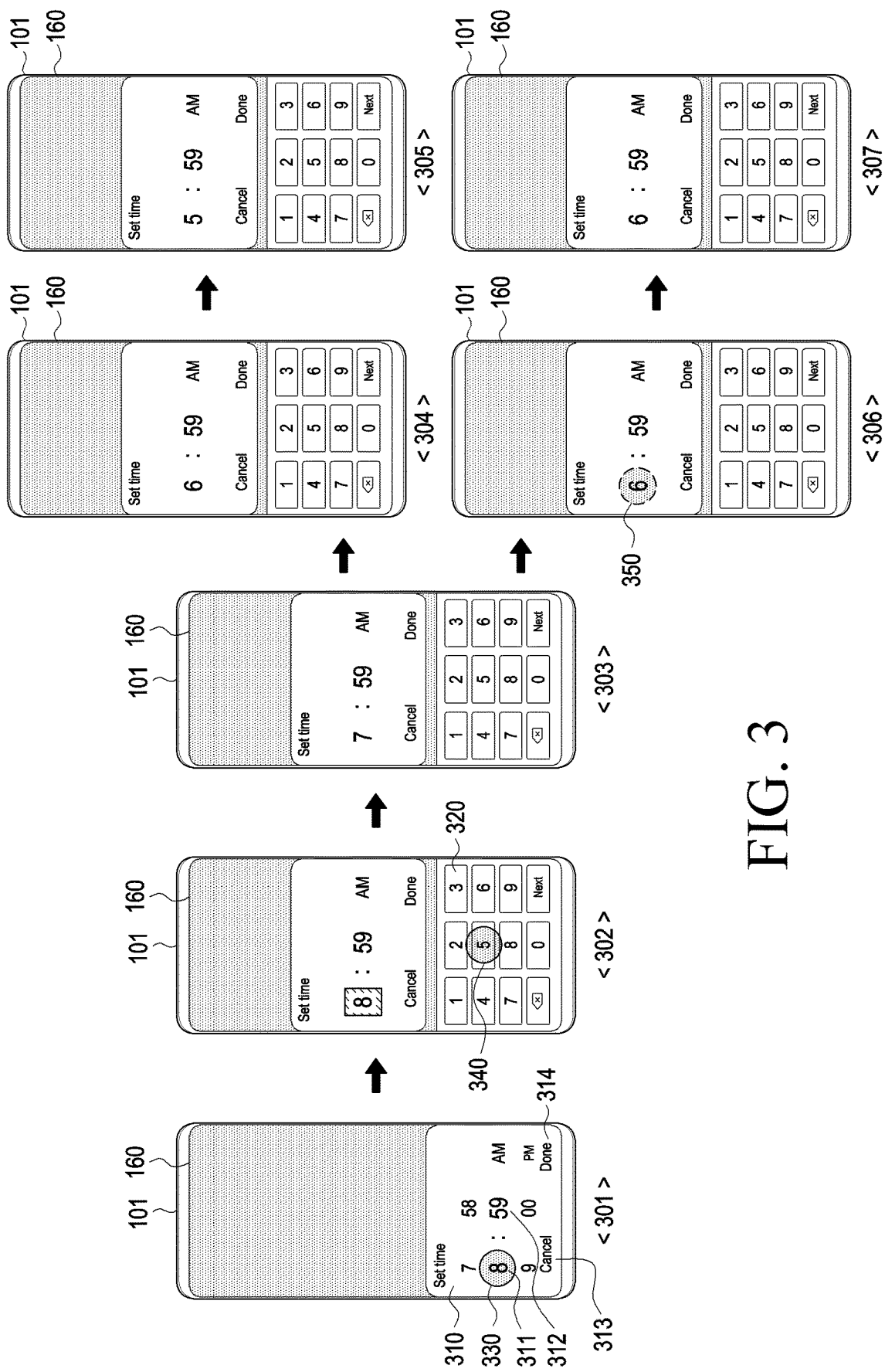
FIG. 3 is an embodiment illustrating an operation in which an electronic device displays an animation corresponding to first data, according to various embodiments of the disclosure.

FIG. 3 is an embodiment illustrating an operation that the electronic device 101 displays an animation corresponding to first data, according to various embodiments of the disclosure.

Figure 4:
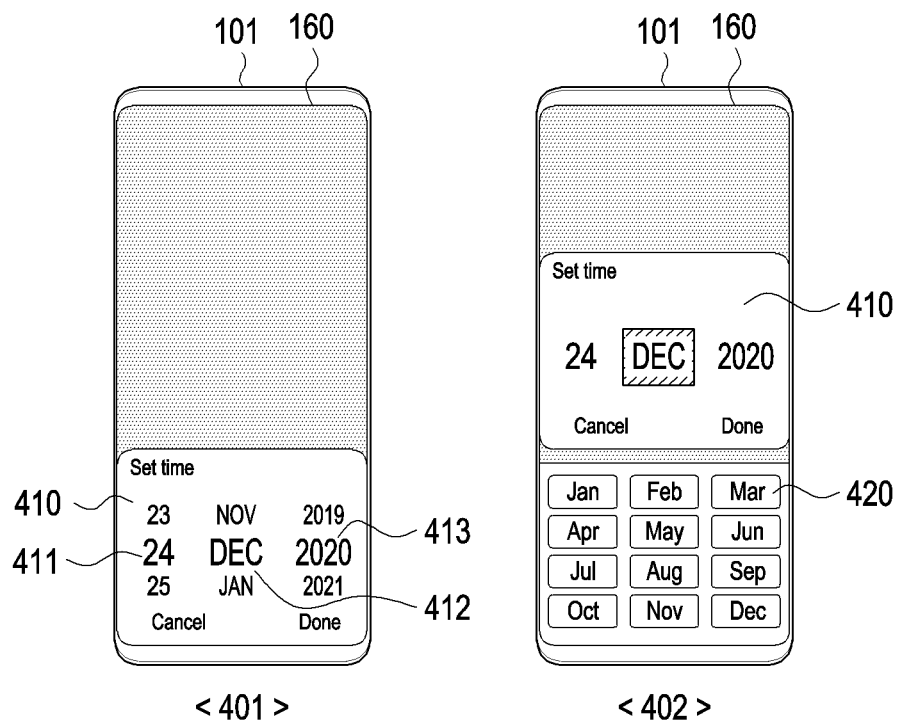
FIG. 4 is a first embodiment that an electronic device displays a second screen corresponding to a type of first data, according to various embodiments of the disclosure.

FIG. 4 is a first embodiment that the electronic device 101 displays a second screen corresponding to a type of first data, according to various embodiments of the disclosure.

Figure 5:
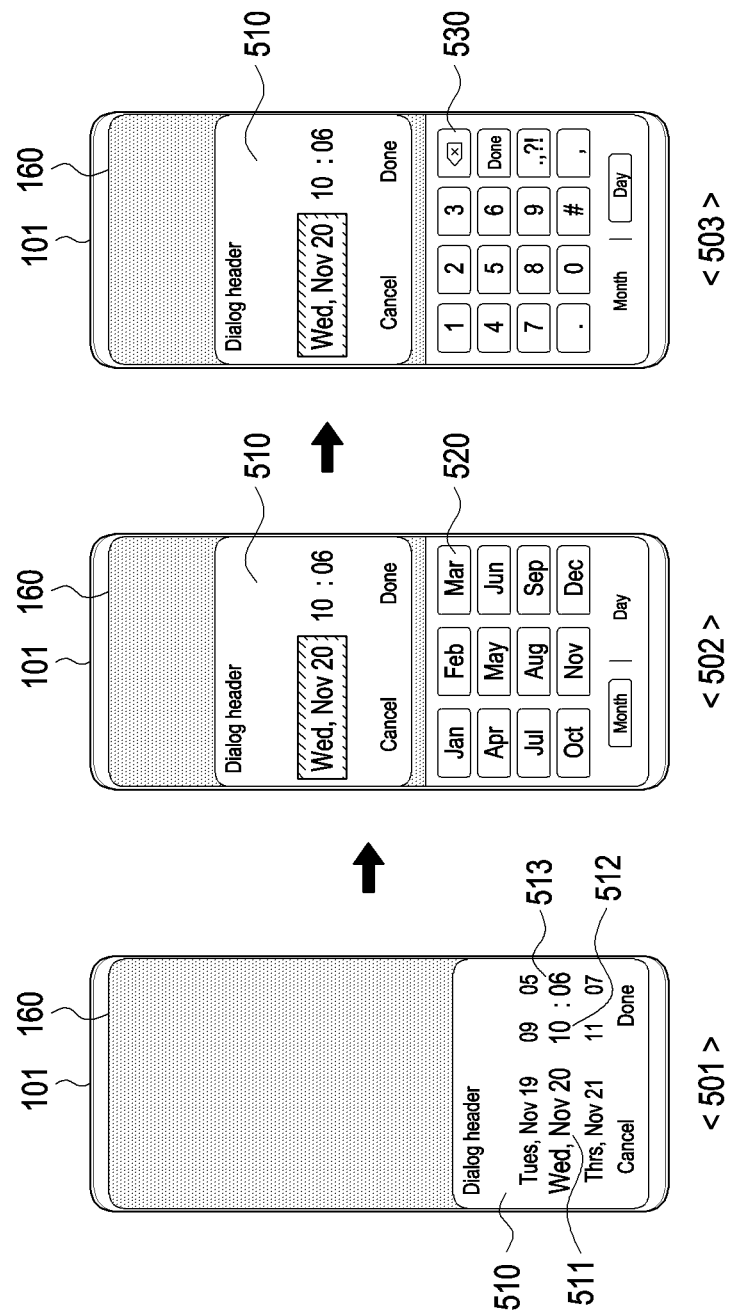
FIG. 5 is a second embodiment that an electronic device displays a second screen corresponding to a type of first data, according to various embodiments of the disclosure.

FIG. 5 is a second embodiment that a second embodiment in which the electronic device 101 displays a second screen corresponding to a type of first data, according to various embodiments of the disclosure.

In operation 201, according to various embodiments, the electronic device 101 (e.g., the processor 120 of FIG. 1) may control a display (e.g., the display module 160 of FIG. 1) to display a first screen for configuring at least one piece of data. For example, referring to view <301> of FIG. 3, the electronic device 101 may display, through the display 160, a first screen 310 for configuring first data 311 (e.g., hour) and second data 312 (e.g., minute), and the first screen 310 may include a configuration cancel button 313 for canceling configuration of first data and a configuration completion button 314 for allowing the electronic device 101 to operate according to the configured first data. For another example, referring to view <401> of FIG. 4, the electronic device 101 may display, through the display 160, a first screen 410 for configuring first data 411 (e.g., day), second data 412 (e.g., month), and third data 413 (e.g., year). For still another example, referring to view <501> of FIG. 5, the electronic device 101 may display, through the display 160, a first screen 510 for configuring first data 511 (e.g., month/day), second data 512 (e.g., hour), and third data 513 (e.g., minute). According to an embodiment, the first screen may provide a user interface capable of selecting data according to a first format. For example, referring to view 301 of FIG. 3, the first screen 310 may provide a user interface capable of selecting data according to a first format (e.g., a rotary dial), and the electronic device 101 may change the first data 311 or the second data 312 according to the first format, based on an upward/downward swipe input received from a user.

In operation 203, according to various embodiments, the electronic device 101 (e.g., the processor 120 of FIG. 1) may control the display 160 to display a second screen associated with first data while displaying the first screen. According to an embodiment, while displaying the first screen, the electronic device 101 may display the second screen associated with the first data through the display 160, in response to a user input with respect to the first data within the first screen. For example, referring to view <301> and view <302> of FIG. 3, while displaying the first screen 310, the electronic device 101 may display a second screen 320 associated with the first data 311 through the display 160, in response to a user input 330 (e.g., a tap) with respect to the first data 311 within the first screen 310. For another example, referring to view <402> of FIG. 4, while displaying the first screen 410, the electronic device 101 may display a second screen 420 associated with the second data 412 through the display 160, in response to a user input (e.g., a tap) with respect to the second data 412 within the first screen 410. For still another example, referring to view <502> of FIG. 5, while displaying the first screen 510, the electronic device 101 may display a second screen 520 associated with the first data 511 through the display 160, in response to a user input (e.g., a tap) with respect to the first data 511 within the first screen 510.

According to an embodiment, the configuration of the second screen may be determined based on a type of selected data. For example, referring to view <302> of FIG. 3, the electronic device 101 may select, as the second screen, the screen 320 (e.g., a first type of keypad) corresponding to a type (e.g., hour) of the first data 311 selected by a user among multiple second screens previously stored in a memory (e.g., the memory 130 of FIG. 1). For another example, referring to view <402> of FIG. 4, the electronic device 101 may select, as the second screen, the screen 420 (e.g., a second type of keypad) corresponding to a type (e.g., month) of the second data 412 selected by a user among the multiple second screens previously stored in the memory 130.

According to an embodiment, the configuration of the second screen may include multiple sub-screens, based on a type of selected data. For example, referring to view <502> and view <503> of FIG. 5, the electronic device 101 may select, as the second screen, a first sub-screen 520 (e.g., a third type of keypad) and a second sub-screen 530 (e.g., a fourth type of keypad) corresponding to a type (e.g., month/day) of the first data 511 selected by a user among the multiple second screens previously stored in the memory 130.

In operation 205, according to various embodiments, the electronic device 101 (e.g., the processor 120 of FIG. 1) may receive, through the second screen, a first user input for changing a value of the first data displayed on the first screen from a first value to a second value. For example, referring to view <302> of FIG. 3, while a value of the first data 311 is displayed as a first value (e.g., 8) on the first screen 310, the electronic device 101 may receive a first user input 340 (e.g., a tap) for changing the first value to a second value (e.g., 5) through the second screen 320.

In operation 207, according to various embodiments, after receiving the first user input, the electronic device 101 (e.g., the processor 120 of FIG. 1) may control the display 160 to display, through the first screen, an animation which incrementally displays values between the first value and the second value. For example, referring to views <302>, <303>, <304>, and <305> of FIG. 3, after receiving the first user input 340, the electronic device 101 may display, on the display 160, an animation (e.g., 8→7→6→5) in which the value of the first data 311 displayed on the first screen 310 incrementally changes from the first value (e.g., 8) to the second value (e.g., 5). According to an embodiment, after completing the playback of the animation which incrementally displays the values between the first value and the second value of the first data, the electronic device 101 may fixedly display the value of the first data as the first value. For example, referring to view <305> of FIG. 3, while displaying the animation (e.g., 8→7→6→5) in which the value of the first data 311 displayed on the first screen 310 incrementally changes from the first value (e.g., 8) to the second value (e.g., 5), when the playback of the animation is completed in a state where an additional user input with respect to the first data 311 is not received, the electronic device 101 may fixedly display the value of the first data 311 as the first value (e.g., 8) again.

According to various embodiments, while displaying the animation in which the value of the first data 311 incrementally changes from the first value to the second value, the electronic device 101 (e.g., the processor 120 of FIG. 1) may display the value of the first data as the first value, in response to a user input of selecting the configuration cancel button 313. According to an embodiment, while displaying the animation, the electronic device 101 may stop the animation being displayed, in response to the user input of selecting the configuration cancel button 313, and fixedly display the first value. According to an embodiment, while displaying the animation, in response to the user input of selecting the configuration cancel button 313, the electronic device 101 may display, through the display 160, a return animation in which the value of the first data incrementally changes from the currently displayed value to the first value. For example, referring to FIG. 3, while displaying the animation (e.g., 8→7→6→5) in which the value of the first data 311 displayed on the first screen 310 incrementally changes from the first value (e.g., 8) to the second value (e.g., 5), the electronic device 101 may receive the user input of selecting the configuration cancel button 313, and in response to the user input of selecting the configuration cancel button 313, display a return animation (e.g., 6→7→8) in which the value of the first data 311 incrementally changes from the currently displayed value (e.g., 6) to the first value (e.g., 8).

In operation 209, according to various embodiments, in response to a second user input of selecting a third value of the first data while displaying the animation corresponding to the first data through the first screen, the electronic device 101 (e.g., the processor 120 of FIG. 1) may stop the animation and fixedly display the third value of the first data. According to an embodiment, the third value may be a value between the first value and the second value. For example, referring to views <302>, <303>, <306>, and <307> of FIG. 3, in response to a second user input 350 (e.g., a tap) of selecting a third value (e.g., 6) while displaying the animation configured to change the value of the first data displayed on the first screen 310, the electronic device 101 may stop the animation being played back and fixedly display the value of the first data 311 as the third value.

Figure 6:
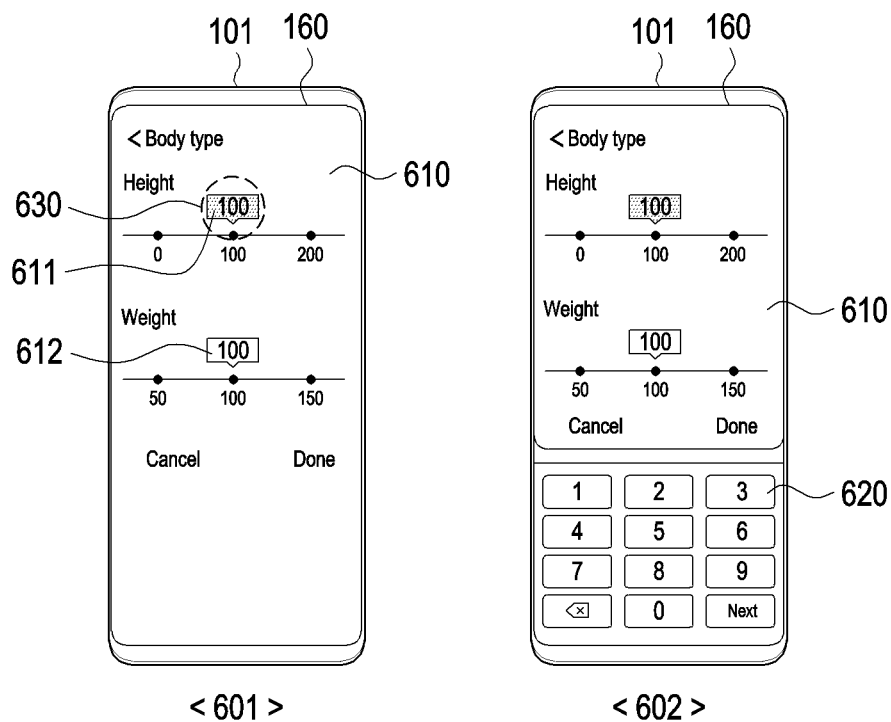
FIG. 6 is a first embodiment that an electronic device provides an animation for changing a value of first data displayed on a first screen, according to various embodiments of the disclosure.

FIG. 6 is a first embodiment that an electronic device (e.g., the electronic device 101 of FIG. 1) provides an animation for changing a value of first data displayed on a first screen, according to various embodiments of the disclosure.

According to various embodiments, the electronic device 101 (e.g., the processor 120 of FIG. 1) may control a display (e.g., the display module 160 of FIG. 1) to display a first screen for configuring first data. For example, referring to view <601> of FIG. 6, the electronic device 101 may display a first screen 610 for configuring first data 611 (e.g., a height) and second data 612 (e.g., a weight) through the display 160.

According to various embodiments, the electronic device 101 (e.g., the processor 120 of FIG. 1) may control the display 160 to display a second screen associated with first data while displaying the first screen. According to an embodiment, while displaying the first screen, the electronic device 101 may display the second screen associated with the first data through the display 160, in response to a user input with respect to the first data within the first screen. For example, referring to view <601> and view <602> of FIG. 6, while displaying the first screen 610, the electronic device 101 may display a second screen 620 associated with the first data 611 through the display 160, in response to a user input 630 (e.g., a tap) with respect to the first data 611 within the first screen 610. According to an embodiment, the configuration of the second screen may be determined based on a type of selected data. For example, referring to view <602> of FIG. 6, the electronic device 101 may select, as the second screen, the screen 620 (e.g., a first type of keypad) corresponding to a type (e.g., a height) of the first data 611 selected by a user among multiple second screens previously stored in a memory (e.g., the memory 130 of FIG. 1).

According to various embodiments, the electronic device 101 (e.g., the processor 120 of FIG. 1) may receive, through the second screen, a first user input for changing a value of the first data displayed on the first screen from a first value to a second value. For example, referring to view <602> of FIG. 6, while displaying a value of the first data 611 as a first value (e.g., 100) on the first screen 610, the electronic device 101 may receive a first user input for changing the first value to a second value (e.g., 200) through the second screen 620. For example, buttons corresponding to numbers 2, 0 and 0 and a Next button may be sequentially entered through the second screen 620.

According to various embodiments, after receiving the first user input, the electronic device 101 (e.g., the processor 120 of FIG. 1) may control the display 160 to display, through the first screen, an animation configured to incrementally display values between the first value and the second value. According to an embodiment, after receiving the first user input, when a difference between the first value and the second value exceeds a first threshold value, the electronic device 101 may control the display 160 to display, through the first screen, the animation configured to incrementally display the values between the first value and the second value of the first data, based on a first interval. For example, referring to view <602> of FIG. 6, after receiving the first user input, when the difference (e.g., 100) between the first value (e.g., 100) and the second value (e.g., 200) exceeds a first threshold value (e.g., 30), the electronic device 101 may display, on the display 160, an animation (e.g., 100→110→120→130→ . . . →190→200) in which a value of the first data 611 displayed on the first screen 610 incrementally changes from the first value (e.g., 100) to the second value (e.g., 200), based on a first interval (e.g., 10 units). According to an embodiment, after receiving the first user input, when the difference between the first value and the second value exceeds a second threshold value, the electronic device 101 may control the display 160 to display, through the first screen, an animation configured to incrementally display remaining values other than values in a specific range among the values between the first value and the second value of the first data, based on a second interval. For example, referring to view <602> of FIG. 6, after receiving the first user input, when the difference (e.g., 100) between the first value (e.g., 100) and the second value (e.g., 200) exceeds a second threshold value (e.g., 50), the electronic device 101 may display, on the display 160, an animation (e.g., 100→102→104→106→ . . . →118→182→184→ . . . →200) in which incrementally changes from the first value (e.g., 100) to the second value (e.g., 200), remaining values (e.g., 100-118 and 182-200) other than values (e.g., 120-180) in a specific range among the values between the first value and the second value, based on a second interval (e.g., 2 units). According to an embodiment, the electronic device 101 may change a position of an indicator corresponding to the first data according to a change in a value of the first data. For example, referring to view <602> of FIG. 6, while displaying, on the display 160, an animation (e.g., 100→110→120→130→ . . . →190→200) in which incrementally changes the first value (e.g., 100) of the first data 611 displayed on the first screen 610 to the second value (e.g., 200), the electronic device 101 may change a position of an indicator (e.g., an arrow) corresponding to the first data 611 to correspond to a changing value of the first data 611. For example, the indicator may move to the right as the first value of the first data 611 increases.

According to various embodiments, in response to a second user input of selecting a third value of the first data while displaying the animation corresponding to the first data through the first screen, the electronic device 101 (e.g., the processor 120 of FIG. 1) may stop the animation corresponding to the first data and fixedly display the third value of the first data. For example, referring to view <602> of FIG. 6, in response to a second user input (e.g., a tap) of selecting a third value (e.g., 150) of the first data 611 while displaying the animation configured to change the value of the first data 611 displayed on the first screen 610, the electronic device 101 may stop the animation being played back, and fixedly display the value of the first data 611 as the third value.

Figure 7:
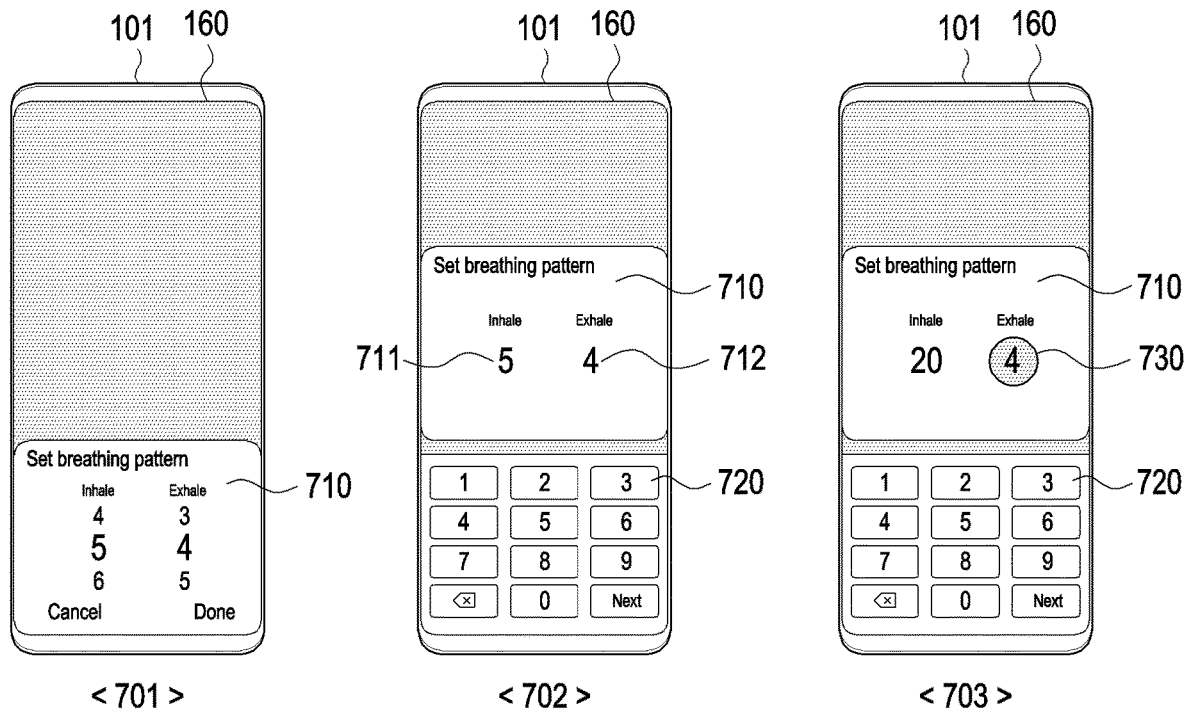
FIG. 7 is a second embodiment that an electronic device provides an animation for changing a value of first data displayed on a first screen, according to various embodiments of the disclosure.

FIG. 7 is a second embodiment that an electronic device (e.g., the electronic device 101 of FIG. 1) provides an animation for changing a value of first data displayed on a first screen, according to various embodiments of the disclosure.

According to various embodiments, the electronic device 101 (e.g., the processor 120 of FIG. 1) may control a display (e.g., the display module 160 of FIG. 1) to display a first screen for configuring at least one piece of data. For example, referring to view <701> and view <702> of FIG. 7, the electronic device 101 may display a first screen 710 for configuring first data 711 (e.g., an inhale pattern per minute) and second data 712 (e.g., an exhale pattern per minute) through the display 160.

According to various embodiments, the electronic device 101 (e.g., the processor 120 of FIG. 1) may control the display 160 to display a second screen associated with first data among the at least one piece of data while displaying the first screen. According to an embodiment, while displaying the first screen, the electronic device 101 may display the second screen associated with the first data through the display 160, in response to a user input with respect to the first data within the first screen. For example, referring to view <701> and view <702> of FIG. 7, while displaying the first screen 710, the electronic device 101 may display a second screen 720 associated with the first data 711 through the display 160, in response to a user input (e.g., a tap) with respect to the first data 711 within the first screen 710. According to an embodiment, the configuration of the second screen may be determined based on a type of selected data. For example, referring to view <702> of FIG. 7, the electronic device 101 may select, as the second screen, the screen 720 (e.g., a first type of keypad) corresponding to a type (e.g., a respiration rate) of the first data 711 selected by a user among multiple second screens previously stored in a memory (e.g., the memory 130 of FIG. 1).

According to various embodiments, the electronic device 101 (e.g., the processor 120 of FIG. 1) may receive, through the second screen, a first user input for changing a value of the first data displayed on the first screen from a first value to a second value. For example, referring to view <702> of FIG. 7, while displaying a value of the first data 711 as a first value (e.g., 5) on the first screen 710, the electronic device 101 may receive a first user input for changing the first value to a second value (e.g., 70) through the second screen 720. For example, the first user input may include sequential selection of a button corresponding to 7, a button corresponding to 0, and a button corresponding to Next.

According to various embodiments, after receiving the first user input, the electronic device 101 (e.g., the processor 120 of FIG. 1) may control the display 160 to display, through the first screen, a first animation in which values between the first value and the second value of the first data are incrementally displayed. For example, referring to view <702> of FIG. 7, after receiving the first user input, the electronic device 101 may display, on the display 160, a first animation (e.g., 5→6→7→ . . . →68→69→70) in which the value of the first data 711 displayed on the first screen 710 incrementally changes from the first value (e.g., 5) to the second value (e.g., 70).

According to various embodiments, the electronic device 101 (e.g., the processor 120 of FIG. 1) may control the display 160 to display a third screen associated with second data among the at least one piece of data while displaying the first animation. According to an embodiment, while displaying the first animation, the electronic device 101 may display the third screen associated with the second data through the display 160, in response to a user input with respect to the second data within the first screen. For example, referring to view <703> of FIG. 7, while displaying the first animation (e.g., 20 (an instantaneous display value)) in which the value of the first data 711 displayed on the first screen 710 incrementally changes from the first value (e.g., 5) to the second value (e.g., 70), the electronic device 101 may display a third screen 720 associated with the second data 712 through the display 160, in response to a user input 730 (e.g., a tap) with respect to the second data 712 within the first screen 710. According to an embodiment, when a predetermined time has elapsed after completing the playback of the first animation, the electronic device 101 may display the third screen associated with the second data within the first screen through the display 160. For example, referring to view <704> of FIG. 7, when a predetermined time (e.g., 2 seconds) has elapsed after the value of the first data 711 reaches the second value (e.g., 70) by completing the playback of the first animation in which the value of the first data 711 displayed on the first screen 710 incrementally changes from the first value (e.g., 5) to the second value (e.g., 70), the electronic device 101 may fixedly display the value of the first data 711 as the second value, and display the third screen 720 associated with the second data 712 through the display 160 to change a value of the second data 712.

According to various embodiments, while displaying the first animation, the electronic device 101 (e.g., the processor 120 of FIG. 1) may receive, through the third screen, a second user input for changing a value of the second data displayed on the first screen from a third value to a fourth value. For example, referring to view <703> of FIG. 7, while displaying the first animation in which the value of the first data 711 displayed on the first screen 710 incrementally changes from the first value (e.g., 5) to the second value (e.g., 70), the electronic device 101 may receive, through the third screen 720, a second user input for changing a third value (e.g., 4) of the second data 712 displayed on the first screen 710 to a fourth value (e.g., 60).

According to various embodiments, after receiving the second user input, while displaying the first animation, the electronic device 101 (e.g., the processor 120 of FIG. 1) may control the display 160 to display, through the first screen, a second animation configured to incrementally display values between the third value and the fourth value of the second data. For example, referring to view <705> of FIG. 7, after receiving the second user input, while displaying the first animation (e.g., 30 (an instantaneous display value)) in which the value of the first data 711 displayed on the first screen 710 incrementally changes from the first value (e.g., 5) to the second value (e.g., 70), the electronic device 101 may display, on the display 160, a second animation (e.g., 4→5→6→ . . . →20 (an instantaneous display value)→ . . . →58→59→60) in which the value of the second data 712 displayed on the first screen 710 incrementally changes from the third value (e.g., 4) to the fourth value (e.g., 60). For example, the second user input may include sequential selection of a button corresponding to 6, a button corresponding to 0, and a button corresponding to Next.

According to an embodiment, in response to a third user input of selecting a fifth value of the first data while displaying the first animation and the second animation, while displaying the second animation, the electronic device 101 may stop the first animation and fixedly display the fifth value of the first data. For example, referring to view <706> of FIG. 7, in response to a third user input 740 (e.g., a tap) of selecting a fifth value (e.g., 50) of the first data 711 while displaying the first animation configured to change the value of the first data 711 and the second animation configured to change the value of the second data 712, the electronic device may stop the first animation and fixedly display the fifth value of the first data. According to an embodiment, the fifth value of the first data may be a value between the first value and the second value of the first data while displaying the second animation. According to an embodiment, in response to a fourth user input of selecting a sixth value of the second data while displaying the first animation and the second animation, while displaying the first animation, the electronic device 101 may stop the second animation and fixedly display the sixth value of the second data. For example, referring to view <706> of FIG. 7, in response to a fourth user input 750 (e.g., a tap) of selecting a sixth value (e.g., 45) of the second data 712 while displaying the first animation configured to change the value of the first data 711 and the second animation configured to change the value of the second data 712, the electronic device may stop the second animation and fixedly display the sixth value of the second data 712 while displaying the first animation. According to an embodiment, the sixth value of the second data may be a value between the third value and the fourth value of the second data.

Figure 8:
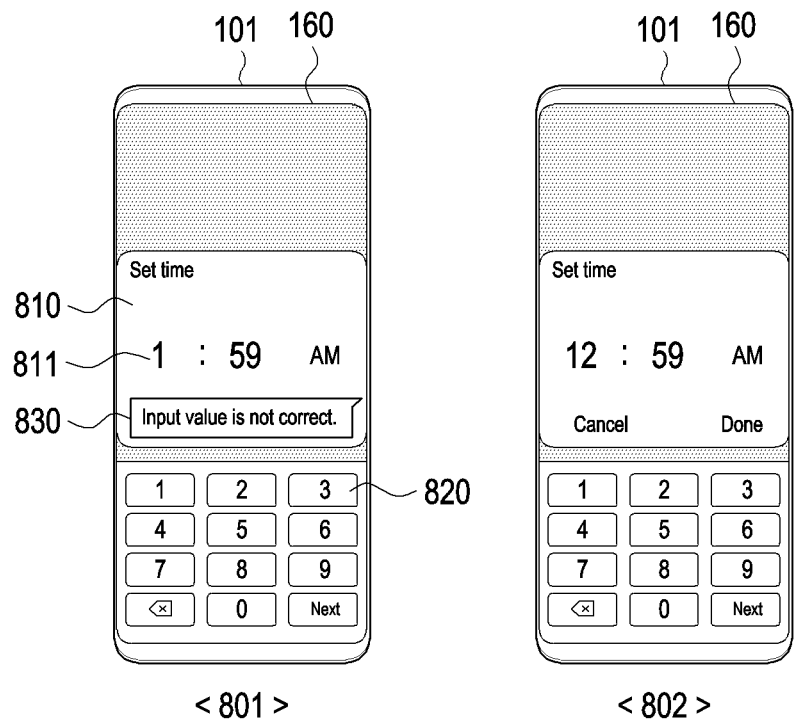
FIG. 8 is an embodiment that an electronic device operates when the electronic device receives a value outside an allowable range with regard to first data, according to various embodiments of the disclosure.

FIG. 8 is an embodiment that an electronic device (e.g., the electronic device 101 of FIG. 1) operates when the electronic device 101 receives a value outside an allowable range with regard to first data, according to various embodiments of the disclosure.

According to various embodiments, an electronic device 101 (e.g., the processor 120 of FIG. 1) may control a display (e.g., the display module 160 of FIG. 1) to display a first screen for configuring at least one piece of data. For example, referring to view <801> of FIG. 8, the electronic device 101 may display a first screen 810 for configuring first data 811 (e.g., hour) through the display 160.

According to various embodiments, the electronic device 101 (e.g., the processor 120 of FIG. 1) may control the display 160 to display a second screen associated with first data among the at least one piece of data while displaying the first screen. For example, referring to view <801> of FIG. 8, while displaying the first screen 810, the electronic device 101 may display a second screen 820 associated with the first data 811 through the display 160, in response to a user input (e.g., a tap) with respect to the first data 811 within the first screen 810.

According to various embodiments, the electronic device 101 (e.g., the processor 120 of FIG. 1) may receive, through the second screen, a first user input for changing a value of the first data displayed on the first screen from a first value to a second value. For example, referring to view <801> of FIG. 8, while displaying a value of the first data 811 as a first value (e.g., 1) on the first screen 810, the electronic device 101 may receive a first user input for changing the first value to a second value (e.g., 30) through the second screen 820.

According to various embodiments, when the second value received according to the first user input corresponds to a value outside an allowable range with regard to the first data, the electronic device 101 (e.g., the processor 120 of FIG. 1) may display an error message through the display 160 and fixedly display a value within the allowable range as a third value of the first data. According to an embodiment, when the second value of the first data received according to the first user input exceeds a maximum value among values in the allowable range with regard to the first data, the electronic device 101 may display an error message through the display 160 and fixedly display the maximum value as the third value of the first data. For example, referring to view <801> and view <802> of FIG. 8, when the second value (e.g., 30) of the first data 811 received according to the first user input exceeds a maximum value (e.g., 12) among values (e.g., 0 to 12) in an allowable range with regard to the first data, after displaying an error message 830 through the display 160, the electronic device 101 may fixedly display the third value as the first data. For example, when the second value of the first data received according to the first user input is greater than a maximum value among the values in the allowable range with regard to the first data, the electronic device 101 may fixedly display the maximum value as a third value of the first data. According to an embodiment, when the second value of the first data received according to the first user input is less than a minimum value among the values in the allowable range with regard to the first data, the electronic device 101 may fixedly display the minimum value as the third value of the first data. For example, when the second value (e.g., 0) of the first data (e.g., day) received according to the first user input is less than the minimum value (e.g., 1) among the values (e.g., 1 to 31) in the allowable range with regard to the first data, after displaying the error message through the display 160, the electronic device 101 may fixedly display the minimum value as the third value of the first data. According to an embodiment, the allowable range may be differently configured by a user or an administrator of the electronic device 101 with regard to each data type. For example, when a type of data corresponds to an hour, an allowable range of the data may be 0 to 24, and when a type of data corresponds to a minute, an allowable range of the data may be 0 to 60.

Figure 9:
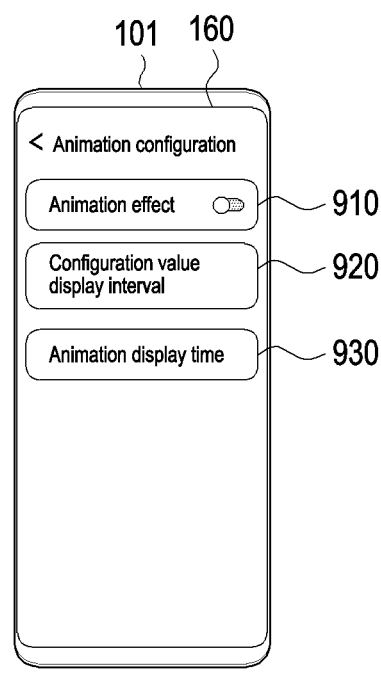
FIG. 9 is a screen for configuring an animation corresponding to at least one piece of data by an electronic device, according to various embodiments of the disclosure.

FIG. 9 is a screen for configuring an animation corresponding to at least one piece of data by an electronic device (e.g., the electronic device 101 of FIG. 1), according to various embodiments of the disclosure.

According to various embodiments, an electronic device 101 (e.g., the processor 120 of FIG. 1) may display an animation configuration screen for configuring an animation corresponding to at least one piece of data through a display (e.g., the display module 160 of FIG. 1). For example, referring to FIG. 9, the electronic device 101 may display, through the display 160, an animation configuration screen including a first item 910 for determining whether to apply an effect of the animation, a second item 920 for configuring a display interval between configuration values displayed by the animation, and/or a third item 930 for configuring the duration of the animation.

According to an embodiment, the electronic device 101 may adjust a display interval of configuration values included in an animation according to a configuration value of the second item 920. According to an embodiment, the electronic device 101 may configure a display interval corresponding to a change range of data, based on a user input received through the second item 920. For example, the electronic device 101 may configure a display interval of first data to a first interval (e.g., 2 units), based on a difference between a first value (e.g., an initial display value) and a second value (e.g., a user input value) of the first data being included in a first range (e.g., 0-50), and configure the display interval of the first data to a second interval (e.g., 4 units), based on the difference between the first value and the second value being included in a second range (e.g., 51-100). The second item 920 may allow for selection of values for the first range, the second range, the first interval and the second interval. Embodiments are not limited to two ranges and two intervals, and additional intervals and ranges may be provided.

According to an embodiment, the electronic device 101 may adjust a total playback time for displaying an animation according to a configuration value of the third item 930. For example, the electronic device 101 may display an animation in which a value of at least one piece of data incrementally changes from a first value (e.g., an initial display value) to a second value (e.g., a user input value), according to an animation playback time (e.g., n seconds) configured in the third item 930.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device (e.g., the electronic device 101 of FIG. 1) may include a display (e.g., the display module 160 of FIG. 1), and a processor (e.g., the processor 120 of FIG. 1), wherein the processor is configured to control the display to display a first screen (e.g., the first screen 310 of FIG. 3) for configuring first data, control the display to display a second screen (e.g., the second screen 320 of FIG. 3) associated with the first data (e.g., the first data 311 of FIG. 3) while the first screen is displayed, receive, through the second screen, a first user input (e.g., the first user input 340 of FIG. 3) for changing a value of the first data displayed on the first screen from a first value to a second value, and based on the first user input, control the display to display, through the first screen, an animation in which values between the first value and the second value are incrementally displayed.

According to various embodiments, the processor may be configured to control the display, based on a second user input of selecting a third value of the first data while displaying the animation through the first screen, to stop the animation and to display the third value of the first data.

According to an embodiment, a configuration of the second screen may be determined based on a type of the first data.

According to various embodiments, the processor may be configured to, based on a difference between the first value and the second value exceeding a first threshold value, control the display to display, through the first screen, the animation in which the values between the first value and the second value are incrementally displayed, according to a first interval.

According to various embodiments, the processor may be configured to, based on a difference between the first value and the second value exceeding a second threshold value, control the display to display, through the first screen, the animation in which remaining values other than values in a specific range among the values between the first value and the second value are incrementally displayed, according to a second interval.

According to various embodiments, the processor may be configured to, while the animation is displayed, control the display to display a third screen associated with second data displayed on the first screen, while the animation is displayed, receive, through the third screen, a second user input for changing a value of the second data from a third value to a fourth value, and based on the second user input, while the animation is displayed, control the display to display an additional animation in which values between the third value and the fourth value are incrementally displayed.

According to various embodiments, the processor may be configured to control the display, based on a third user input of selecting a fifth value of the first data while the animation and the additional animation are displayed, to stop the animation and display the fifth value of the first data, while displaying the additional animation continuously.

According to various embodiments, the processor may be configured to, control the display to display the third screen associated with the second data displayed on the first screen, based on a third user input with respect to the second data displayed on the first screen while the animation is displayed.

According to various embodiments, the processor may be configured to, based on the second value exceeding a maximum value among values in an allowable range with regard to the first data, control the display to display a first error message and display the maximum value as a third value of the first data.

According to various embodiments, the processor may be configured to, based on the second value being below a minimum value among values in an allowable range with regard to the first data, control the display to display a second error message and display the minimum value as a third value of the first data.

According to various embodiments, an operating method of an electronic device including a display may include controlling the display to display a first screen for configuring first data, controlling the display to display a second screen associated with the first data while the first screen is displayed, receiving, through the second screen, a first user input for changing a value of the first data displayed on the first screen from a first value to a second value, and based on the first user input, controlling the display to display, through the first screen, an animation in which displays values between the first value and the second value are incrementally displayed.

According to various embodiments, the operating method of the electronic device may further include controlling the display, based on a second user input of selecting a third value of the first data while displaying the animation through the first screen, to stop the animation and to display the third value of the first data.

According to various embodiments, the displaying of the animation may include, based on a difference between the first value and the second value exceeding a first threshold value, controlling the display to display, through the first screen, the animation in which the values between the first value and the second value are incrementally displayed, according to a first interval.

According to various embodiments, the displaying of the animation may include, based on a difference between the first value and the second value exceeding a second threshold value, controlling the display to display, through the first screen, the animation in which remaining values other than values in a specific range among the values between the first value and the second value are incrementally displayed, according to a second interval.

According to various embodiments, the operating method of the electronic device may further include, while the animation is displayed, controlling the display to display a third screen associated with second data displayed on the first screen, while the animation is displayed, receiving, through the third screen, a second user input for changing a value of the second data from a third value to a fourth value, and based on the second user input, while the animation is displayed, controlling the display to display an additional animation in which values between the third value and the fourth value are incrementally displayed.

According to various embodiments, the operating method of the electronic device may further include controlling the display, based on a third user input of selecting a fifth value of the first data while the animation and the additional animation are displayed, to stop the animation and display the fifth value of the first data, while displaying the additional animation continuously.

According to various embodiments, the controlling of the display to display the third screen may include, controlling the display to display the third screen associated with the second data displayed on the first screen, based on a third user input with respect to the second data displayed on the first screen while the animation is displayed.

According to various embodiments, the operating method of the electronic device may further include, based on the second value exceeding a maximum value among values in an allowable range with regard to the first data, controlling the display to display a first error message and display the maximum value as a third value of the first data.

According to various embodiments, the operating method of the electronic device may further include, based on the second value being below a minimum value among values in an allowable range with regard to the first data, controlling the display to display a second error message and display the minimum value as a third value of the first data.

What is claimed is:

1. An electronic device comprising:
    a display;
    a processor; and
    memory storing a plurality of keypads corresponding to a plurality of data types and storing instructions that, when executed by the processor, cause the electronic device to:
    control the display to display a first screen for configuring first data, wherein the first screen comprises a configuration cancel button,
    control the display to display a second screen associated with the first data while the first screen is displayed, wherein a configuration of the second screen is determined based on a type of the first data,
    receive, through the second screen, a first user input for changing a value of the first data displayed on the first screen from a first value to a second value,
    based on the first user input, control the display to display, through the first screen, an animation in which values between the first value and the second value are incrementally displayed,
    while a displayed value that is between the first value and the second value is displayed as part of the animation, receive, through selection of the configuration cancel button provided in the first screen, a second user input for canceling configuration of the first data, and
    based on the second user input, control the display to display, through the first screen, a return animation in which values are incrementally changed from the displayed value back to the first value,
    wherein the second screen is configured to include the first value and a keypad, among the plurality of keypads, corresponding to the type of the first data, the keypad being configured for inputting the second value.

2. The electronic device of claim 1, wherein the instructions, when executed by the processor, cause the electronic device to, control the display, based on a third user input of selecting a third value of the first data while displaying the animation through the first screen, to stop the animation and to display the third value of the first data.

3. The electronic device of claim 1, wherein the instructions, when executed by the processor, cause the electronic device to, based on a difference between the first value and the second value exceeding a first threshold value, control the display to display, through the first screen, the animation in which the values between the first value and the second value are incrementally displayed, according to a first interval.

4. The electronic device of claim 1, wherein the instructions, when executed by the processor, cause the electronic device to, based on a difference between the first value and the second value exceeding a second threshold value, control the display to display, through the first screen, the animation in which remaining values other than values in a specific range among the values between the first value and the second value are incrementally displayed, according to a second interval.

5. The electronic device of claim 1, wherein the instructions, when executed by the processor, cause the electronic device to,
    control the display to display the first screen for configuring the first data and second data,
    while the animation is displayed, control the display to display a third screen associated with the second data displayed on the first screen,
    while the animation is displayed, receive, through the third screen, a third user input for changing the value of the second data from a third value to a fourth value, and
    based on the third user input, while the animation is displayed, control the display to display an additional animation in which values between the third value and the fourth value are incrementally displayed.

6. The electronic device of claim 5, wherein the instructions, when executed by the processor, cause the electronic device to, control the display, based on a fourth user input of selecting a fifth value of the first data while the animation and the additional animation are displayed, to stop the animation and display the fifth value of the first data, while displaying the additional animation continuously.

7. The electronic device of claim 5, wherein the instructions, when executed by the processor, cause the electronic device to, control the display to display the third screen associated with the second data displayed on the first screen, based on a fourth user input with respect to the second data displayed on the first screen while the animation is displayed.

8. The electronic device of claim 1, wherein the instructions, when executed by the processor, cause the electronic device to, based on the second value exceeding a maximum value among values in an allowable range with regard to the first data, control the display to display a first error message and display the maximum value as a third value of the first data.

9. The electronic device of claim 1, wherein the instructions, when executed by the processor, cause the electronic device to, based on the second value being below a minimum value among values in an allowable range with regard to the first data, control the display to display a second error message and display the minimum value as a third value of the first data.

10. A method of operating an electronic device comprising a display, the method comprising,
    displaying a first screen for configuring first data, wherein the first screen comprises a configuration cancel button;

displaying a second screen associated with the first data while the first screen is displayed, wherein a configuration of the second screen is determined based on a type of the first data;

receiving, through the second screen, a first user input for changing a value of the first data displayed on the first screen from a first value to a second value;

based on the first user input, displaying, through the first screen, an animation in which values between the first value and the second value are incrementally displayed;

while a displayed value that is between the first value and the second value is displayed as part of the animation, receiving, through selection of the configuration cancel button provided in the first screen, a second user input for canceling configuration of the first data; and based on the second user input, displaying, through the first screen, a return animation in which values are incrementally changed from the displayed value back to the first value, wherein the second screen is configured to include the first value and a keypad, among a plurality of keypads, corresponding to the type of the first data, the keypad being configured for inputting the second value.

11. The method of claim 10, further comprising:

based on a third user input of selecting a third value of the first data while displaying the animation through the first screen, stopping the animation and displaying the third value of the first data.

12. The method of claim 10, wherein the displaying of the animation comprises:

based on a difference between the first value and the second value exceeding a first threshold value, displaying, through the first screen, the animation in which the values between the first value and the second value are incrementally displayed, according to a first interval.

13. The method of claim 10, wherein the displaying of the animation comprises:

based on a difference between the first value and the second value exceeding a second threshold value, displaying, through the first screen, the animation in which remaining values other than values in a specific range among the values between the first value and the second value are incrementally displayed, according to a second interval.

14. The method of claim 10, further comprising:

displaying the first screen for configuring the first data and second data;

while the animation is displayed, displaying a third screen associated with the second data displayed on the first screen;

while the animation is displayed, receiving, through the third screen, a third user input for changing the value of the second data from a third value to a fourth value; and based on receiving the third user input, while the animation is displayed, displaying an additional animation in which values between the third value and the fourth value are incrementally displayed.

15. The method of claim 14, further comprises:

based on a fourth user input of selecting a fifth value of the first data while the animation and the additional animation are displayed, stopping the animation and displaying the fifth value of the first data, while displaying the additional animation continuously.

16. The method of claim 14, wherein the displaying the third screen comprises:

displaying the third screen associated with the second data displayed on the first screen, based on a fourth user input with respect to the second data displayed on the first screen while the animation is displayed.

17. The method of claim 10, further comprises:

based on the second value exceeding a maximum value among values in an allowable range with regard to the first data, displaying a first error message and the maximum value as a third value of the first data.

18. A non-transitory computer-readable storage medium for storing instructions which, when executed by a processor of an electronic device, cause the electronic device to perform:

displaying a first screen for configuring first data, wherein the first screen comprises a configuration cancel button;

displaying a second screen associated with the first data while the first screen is displayed, wherein a configuration of the second screen is determined based on a type of the first data;

receiving, through the second screen, a first user input for changing a value of the first data displayed on the first screen from a first value to a second value;

based on the first user input, displaying, through the first screen, an animation in which values between the first value and the second value are incrementally displayed;

while a displayed value that is between the first value and the second value is displayed as part of the animation, receiving, through selection of the configuration cancel button provided in the first screen, a second user input for canceling configuration of the first data; and based on the second user input, displaying, through the first screen, a return animation in which values are incrementally changed from the displayed value back to the first value, wherein the second screen is configured to include the first value and a keypad, among a plurality of keypads, corresponding to the type of the first data, the keypad being configured for inputting the second value.

* * * * *